3 Sheets—Sheet 1.
G. H. PERKINS.
MACHINES FOR SHEARING SHEET-METAL.
No. 194,168. Patented Aug. 14, 1877.
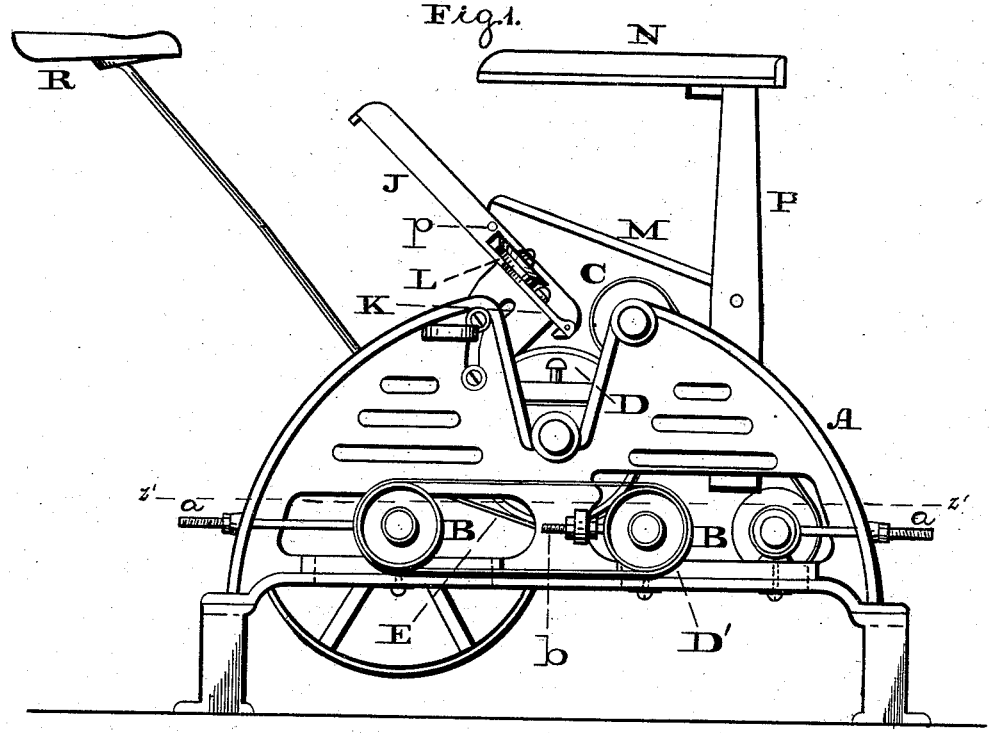
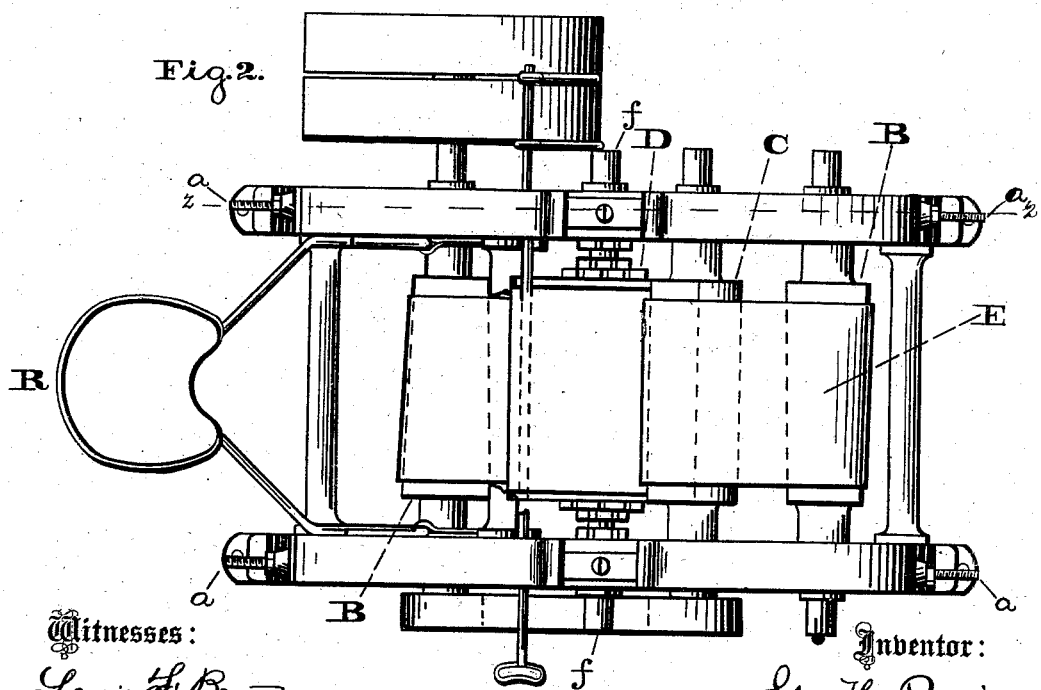

3 Sheets—Sheet 2.

G. H. PERKINS.
MACHINES FOR SHEARING SHEET-METAL.

No. 194,168. Patented Aug. 14, 1877.

Witnesses:
Lewis F. Brous,
A. P. Grant.

Inventor:
Geo. H. Perkins
by John A. Wiedersheim
Attorney.

UNITED STATES PATENT OFFICE.

GEORGE H. PERKINS, OF PHILADELPHIA, PENNSYLVANIA, ASSIGNOR TO LE COMTE & PERKINS MANUFACTURING COMPANY, LIMITED, OF SAME PLACE.

IMPROVEMENT IN MACHINES FOR SHEARING SHEET METAL.

Specification forming part of Letters Patent No. 194,168, dated August 14, 1877; application filed September 28, 1876.

*To all whom it may concern:*

Be it known that I, GEORGE H. PERKINS, of the city and county of Philadelphia, and State of Pennsylvania, have invented a new and useful Improvement in Apparatus for Cutting or Shearing Sheet Metal; and I do hereby declare the following to be a clear and exact description of the nature thereof, sufficient to enable others skilled in the art to which my invention appertains to fully understand, make, and use the same, reference being had to the accompanying drawings, making part of this specification, in which—

Figure 3:
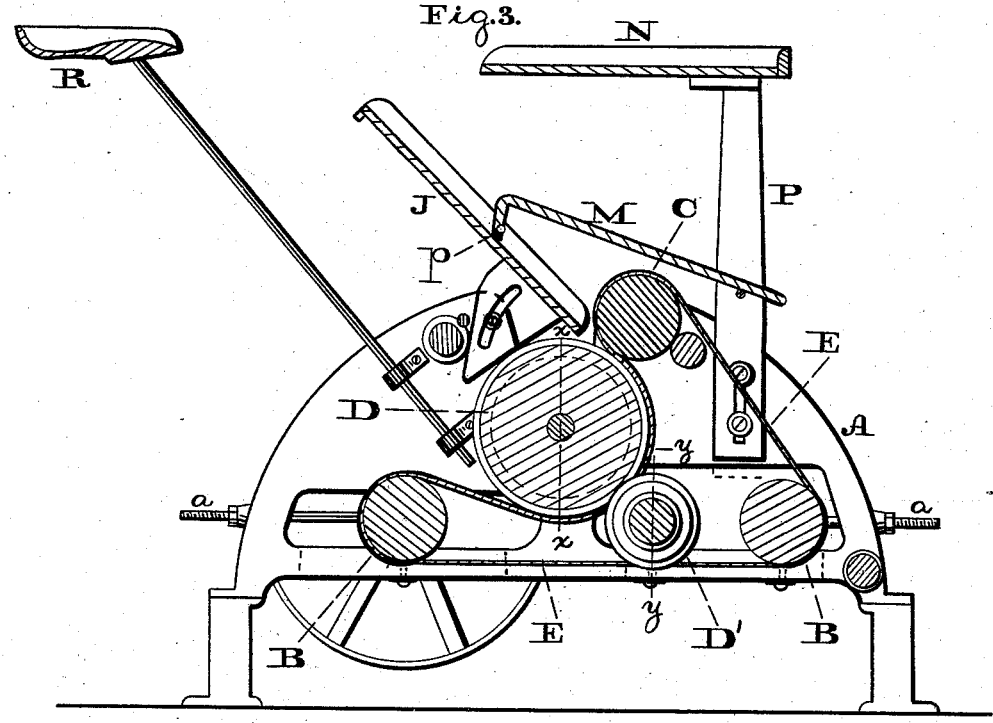
Figure 4:
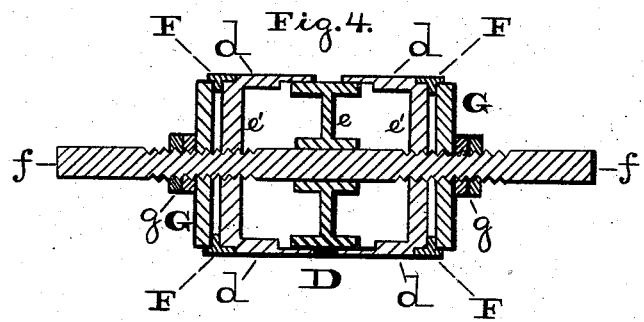
Figure 5:
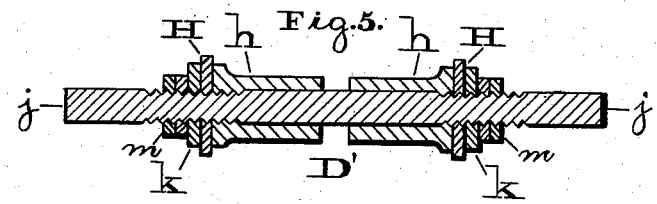
Figure 6:
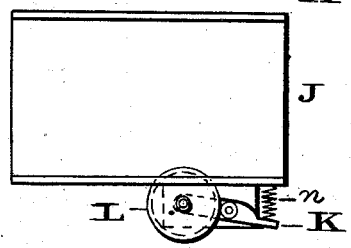
Figure 7:
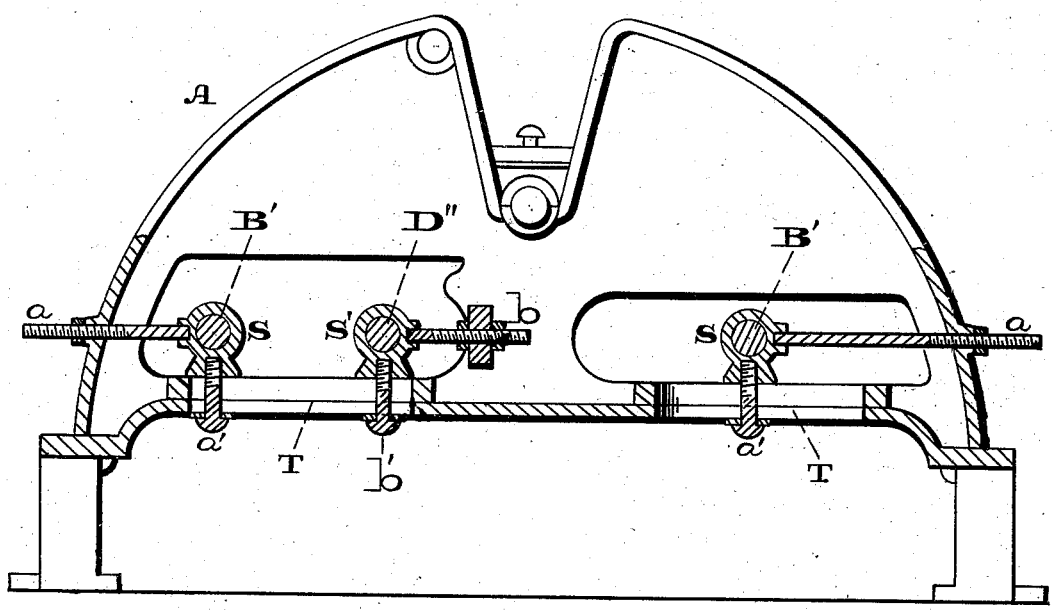
Figure 8:
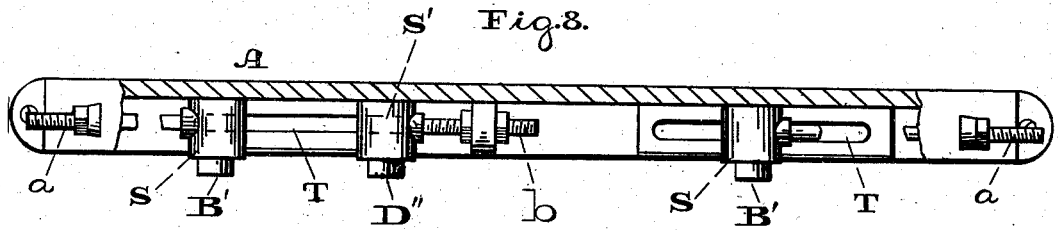

Figure 1 is a side view of the apparatus embodying my invention. Fig. 2 is a top or plan view of a portion thereof. Fig. 3 is a central vertical longitudinal section thereof. Figs. 4 and 5 are central sections of the cutting-rollers in lines $x\,x$, $y\,y$, Fig. 3. Fig. 6 is a top view of the feeding-chute and guide. Fig. 7 is a vertical section of a portion in line $z\,z$ of Fig. 2. Fig. 8 is a horizontal section of a portion in line $z'\,z'$, Fig. 1.

Similar letters of reference indicate corresponding parts in the several figures.

This invention relates to an apparatus having an endless apron passing over adjustable rollers, combined with adjustable cutters and a guiding-chute, for cutting and shearing sheet metal; and the invention consists in the novel combinations of devices hereinafter described and claimed.

Referring to the drawings, A represents a frame, on which are mounted two rollers, B, and above them a roller, C. D represents a drum, which is mounted on the frame A, and located at a point below the roller C and between the rollers B B. E represents an endless apron or belt, which is passed around the rollers B and C and drum D, as more readily seen in Fig. 3, and in order to hold said apron properly taut, or regulate the tension thereof, the bearings of one or both of the rollers B are fitted to the frame A by sliding joints, which admit of the movement of the bearings, and consequent adjustment of the tension of the apron. Screw-rods $a$, with suitable nuts, are employed to hold the bearings of the rollers in their adjusted positions. D' represents another drum, which is mounted on the frame A adjacent to the drum D. In order to adjust the drum D' to the drum D, the bearings of said drum D' are fitted to the frame A by a sliding joint, which admits of the movement of the bearings, so as to permit the drum D' to be moved to or from the drum D. Screw-rods $b$ and suitable nuts are employed to hold the bearings of the drum D' in their adjusted positions. The drum D is split, or constructed of two cylindrical or hollow shells, $d\,d$, which are supported centrally on a wheel or pulley, $e$, secured to the shaft $f$, on which the drum is mounted. The heads $e'$, at the portions through which passes the shaft, are screw-threaded, and engage with screw-threads on the shaft. On the heads $e'$ there are fitted circular or band cutters F, which rotate with the drums, and on the shaft $f$ there are placed disks G, which are adapted to bear against the cutter F or heads $e'$, or both. By properly rotating the shells $d$ they will advance to or recede from each other, and thereby decrease or increase the width of the drum D, thus providing for cutting, shearing, or trimming plates of different widths. Jam-nuts $g$ are fitted to the shaft $f$, to hold the shells of the drum in their adjusted positions.

It is also evident that by loosing the nuts $g$ and disks G the cutters F may be displaced for purposes of grinding or sharpening.

The drum D' is constructed of two hollow shells, sleeves, or cylinders, $h$, which are supported on the bearing-shaft $j$, and they are fitted thereto by screw-threads, so as to be capable of advancing to or receding from each other, and thus decrease or increase the width of the drum D'. On the shaft $j$, adjacent to the cylinders $h$, there are fitted circular or band cutters H, which are held against the cylinders $h$, and the latter held in adjusted positions by means of disks $k$ and jam-nuts $m$. The adjustment of the drum D provides means for cutting, shearing, or trimming plates of different widths.

It is also evident that by loosing the nuts $m$ and disks $k$ the cutters H may be displaced for purposes of grinding or sharpening.

J represents the feed-chute, which consists of a table or board mounted on an axis, and inclined or arranged tangentially with respect to drum D, its lower end being adjacent to the apron E at a point between the roller C and drum D, and adapted to be presented to the apron at said point at various angles, the axial bearing of the chute permitting the same, set-screws or nuts, or both, being provided for holding the chute in its adjusted positions.

To one side of the chute there is pivoted an arm, K, on which is journaled a shouldered wheel, L, a portion of the circumference of which projects into the space above the chute, as more readily seen in Fig. 6, and it is forced toward the chute by means of a spring, $n$, suitably applied.

M represents a table, which, located above the roller C, is hinged to the feed-chute J, the axial rod $p$ of the table extending across the chute above the face thereof.

The table M is designed to receive plates or sheets of metal, and is arranged for the convenience of the operator. Its axial rod $p$ serves the double purpose of affording a guide and director for the chute, for it must be observed that the plates of metal on the chute pass under this rod, and are thereby prevented from being jolted off or displaced by the vibrations of the machine, and also acting as a support for one end of the table M, the other end of this table being retained on the standards P.

N represents an elevated platform, which is mounted on a standard, P, secured to the frame A, and preferably adjustable thereon.

The journals B' of the rollers B B have their bearings on bosses S S, fitted to the frame A by sliding joints, and, in order to hold said bearings, the adjusting screw rods or bolts $a$ are connected to them, as has been stated. To the bearings there are also connected screw rods or bolts $a'$, which extend at or about at a right angle to the rods or bolts $a$, and they pass through vertical slots T in the sides or adjacent portions of the frame A.

The bearings S' of the journals D'' of the drum D' are held to their positions by the rods or bolts $b$, and likewise by rods or bolts $b'$, which also pass through the slots T in the frame A. While these provisions admit of the adjustments of the tension of the apron E and the drum D', the bearings S S' may be readily released and removed, whereby the displacement of the rollers B and drum D' may be easily accomplished. Moreover, the screw rods or bolts $a$ and $a'$, $b$ and $b'$, hold the respective bearings S S' at two points, at or about at a right angle to each other, and prevent shifting of the respective rollers B B and drum D', whereby the apparatus will operate reliably, and cut the sheets true and uniform.

The operation is as follows: The plates or sheets of metal are placed on the platform N, and the operator occupies a seat, R, located convenient to the platform. Power will be communicated to one or all of the rollers B, so as to impart motion to the endless apron E and the drum D, it being, however, evident that when power is communicated to one of the rollers B the movement of the endless apron will cause the rotation of the other roller, B, the roller C, and drum D. A plate is now placed on the chute J, and directed under the rod $p$, so as to come in contact with the wheel L under the shoulder thereof, whereby the plate will be forced against the side or upright portion of the chute opposite the wheel L, and thus guided down the chute true to the apron E, by which it is drawn in between the drum D and the apron, and carried to the cutting-points of the cutters F H, where its sides are cut. The band continues to draw and carry the plate, and then conveys it from the cutters clear of the drum D, so that it may be removed by hand from the apron, or directed to a place of deposit or collection.

It will be seen that the band E takes firm hold of the plate prior to and during the cutting operation, so that it will not slip, twist, or shift laterally, and the work will be uniform and reliable.

As there is variation in the thickness of metal plates or sheets, and it is requisite to direct them to the apron E at an angle that will prevent the latter from being cut when reached by a plate, the chute J, having an axial motion, may be set at the required angle to prevent the cutting of the apron by the plate.

It will be also noticed that the cutters are so located and the parts generally so disposed that the cutters are properly guarded, and accidents are thereby prevented.

Having thus described my invention, what I claim as new, and desire to secure by Letters Patent, is—

1. The endless apron E, passing around the rollers B B C, and caused to bear against the drum D, between which drum and the apron the plate to be cut is introduced and fed by the movement of said apron and drum to cutters F H, the several devices named being combined and arranged for operation in cutting sheet metal, substantially as specified.

2. The divided drum D, having the screw-shaft $f$, and the divided drum D', having the screw-shaft $j$, in combination with the cutters F H and apron E, substantially as and for the purpose described.

3. The drum D, rotary cutters F H, and feeding and holding apron E, in combination with the rollers B B, having adjustable bearings, substantially as and for the purpose set forth.

4. The feed-chute J and guide-wheel L, in combination with the rod $p$, substantially as and for the purpose set forth.

5. The shouldered wheel L, arm K, and spring $n$, in combination with the chute J, substantially as and for the purpose described.

GEORGE H. PERKINS.

Witnesses:
JOHN A. WIEDERSHEIM,
A. P. GRANT.